United States Patent [19]

Wachter

[11] Patent Number: 4,943,410
[45] Date of Patent: * Jul. 24, 1990

[54] COMPACTION APPARATUS FOR SPENT NUCLEAR FUEL RODS

[75] Inventor: William J. Wachter, Glenshaw, Pa.

[73] Assignee: U.S. Tool & Die, Inc., Pittsburgh, Pa.

[ * ] Notice: The portion of the term of this patent subsequent to Nov. 3, 2004 has been disclaimed.

[21] Appl. No.: 97,045

[22] Filed: Sep. 16, 1987

Related U.S. Application Data

[63] Continuation-in-part of Ser. No. 291,230, Aug. 15, 1981, Pat. No. 4,775,507.

[51] Int. Cl.⁵ .............................................. G21C 19/32
[52] U.S. Cl. ................................................. 376/261
[58] Field of Search ........................ 376/261, 272, 260

[56] References Cited

U.S. PATENT DOCUMENTS

| | | | |
|---|---|---|---|
| 4,441,242 | 4/1984 | Hicken et al. | 376/261 |
| 4,659,535 | 4/1987 | Couture et al. | 376/261 |
| 4,671,921 | 6/1987 | Foussard | 376/261 |
| 4,704,247 | 11/1987 | Wachter | 376/261 |
| 4,714,583 | 12/1987 | Wachter | 376/261 |

Primary Examiner—Brooks H. Hunt
Assistant Examiner—Daniel Wasil
Attorney, Agent, or Firm—Clifford A. Poff

[57] ABSTRACT

A fuel rod directing chamber for compacting an array of fuel rods from an uncompacted array corresponding to the spacing of fuel rods in a fuel rod assembly to a compacted array in which no spacing exists between the individual fuel rods. The chamber is comprised of an elongated funnel containing a plurality of cavities extending longitudinally therethrough. The cavities form a plurality of holes at an entry end of the funnel corresponding in number and array to an array of fuel rods in a fuel rod assembly. The spacing between the cavities decreases along the length of the funnel until no spacing exists between the cavities. By causing fuel rods of a spent nuclear fuel rod assembly to pass through the cavities of the directing chamber, the spacing between the individual rods decreases, thereby reducing the reactivity of the rods, and increasing the density thereof. Because the location and identity of each spent fuel rod is determinable even in the compacted array, accountability of the entire amount of spent fuel material is at all times maintained.

15 Claims, 7 Drawing Sheets

COMPACTION APPARATUS FOR SPENT NUCLEAR FUEL RODS

CROSS REFERENCE TO RELATED APPLICATION

This application is a Continuation-in-Part of application Ser. No. 291,230, Filed Aug. 10, 1981, now U.S. Pat. No. 4,775,507.

BACKGROUND OF THE INVENTION

1. Field of the Invention

The present invention relates generally to nuclear waste consolidation apparatus, and, more particularly, to apparatus for consolidating spent nuclear fuel rods into high density arrays.

2. Description of the Prior Art

Commercial nuclear reactor facilities generate electrical power by converting the heat energy given off during a nuclear fission process into electrical energy. Conventionally, nuclear fuel rods filled with fissionable material are employed as the fuel source to fuel the heat-producing nuclear reaction required for the generation of such power. The fuel rods are typically metal tubes filled with a fissionable, nuclear fuel material, and are about 0.4–0.6 inch in diameter and from 8 to 15 feet in length. Groups of such fuel rods are assembled in a fuel rod assembly which includes grids for alignment and support of the fuel rods, a lower end fitting, an upper end fitting, and guide tubes. Within the fuel rod assembly, the individual fuel rods are spaced-apart in a pre-established array, usually a rectangular array, and are spaced-apart in the array at precise locations.

The entire fuel rod assembly containing the array of nuclear fuel rods is introduced into a nuclear reactor core whereat controlled fission is allowed. After the nuclear fuel in the fuel rod assembly is spent to a pre-established level, the "spent" fuel rod assembly is removed from the reactor core and replaced by a new fuel rod assembly. Once removed, the spent fuel rod assembly is stored vertically in a storage rack in an underwater storage area until the radioactive properties of the individual rods and the associated support structure have dissipated.

Presently, spent nuclear fuel rod assemblies are stored without any deliberate change in the structures thereof. Over the course of time, however, more and more spent fuel rod assemblies have been stored in these underwater storage areas; the remaining available space for storing additional spent fuel rod assemblies is decreasing.

Increasing the density of the material stored in the underwater storage areas allows a greater amount of nuclear waste material to be stored in the limited available space of such storage areas. To accomplish this end, a number of suggestions have been made for removing previously stored fuel rod assemblies from the pool, withdrawing the individual spent fuel rods from the assemblies, and thereafter assembling the individual spent fuel rods in new containers or canisters wherein the fuel rods are more densely compacted. These more densely compacted canisters may be returned to the underwater storage areas, and the remaining fuel assembly skeletons dismantled or otherwise disposed of, thereby more efficiently using the limited available space of the underwater storage areas.

In practice, presently proposed compacting processes suffer from inherent difficulties due to the actual configuration of spent nuclear fuel rods after long-term exposure in the nuclear reactor core. In some cases, the fuel rods become twisted and bent out of alignment, sometimes as much as 1.5 inches in an 8-foot long rod.

A further problem exists in that the long, thin fuel rods are difficult to manipulate.

Still further, an additional problem relates to the inherent safety of compacting spent fuel rods. There is a possibility that the fuel rods might become spaced apart by a critical distance while removed from the fuel rod assembly and before compaction and confinement in a storage canister. Such a possibility should be precluded. A final problem involves accountability of the spent fuel material from a nuclear safe-guards point of view.

It is, therefore, an object of the present invention to provide an apparatus to allow the safe compaction of spent nuclear fuel rods from a density corresponding to the density of the fuel rods in a fuel rod assembly to a compacted configuration in which the density is much greater.

It is a further object of the present invention to provide an apparatus which allows the location and identity of each spent fuel rod to be determinable during storage thereof.

SUMMARY OF THE INVENTION

According to the present invention, a fuel rod directing chamber is disclosed for elastically deflecting a plurality of fuel rods from a first, uncompacted array corresponding to the configuration of fuel rods of a first fuel rod density in a fuel rod assembly containing fuel rods, to a second, compacted array having a second fuel rod density. As a result of the present invention, the density of nuclear fuel rods may be more than doubled. According to the invention, the chamber includes an elongated funnel having a plurality of cavities extending longitudinally therethrough. At a first, entry end of the funnel, the plurality of cavities forms a plurality of openings. The openings are spaced at distances corresponding in number and array to an array of fuel rods of a fuel rod assembly thus identifying the position of each rod. The spacing between the cavities decreases along the length of the funnel, and the funnel forms a second, discharge end at a location where no spacing exists between the cavities. The plurality of fuel rods are drawn into the funnel through the openings of the cavities at the entry end of the funnel. The fuel rods are merged towards one another as they are drawn through the cavities thereby causing the density of the fuel rods to be ever-increasing and the reactivity of the array of fuel rods to be continuously reduced. The spacing of the cavities decreases at a rate such that the yield strength of the nuclear fuel rod is not exceeded by a factor of ten to one as the fuel rods are passed therethrough.

BRIEF DESCRIPTION OF THE DRAWINGS

The features and advantages of the present invention as well as others will be more fully understood when the following description is read in light of the accompanying drawings in which.

DESCRIPTION OF THE PREFERRED EMBODIMENT

Figures 1, 1A:
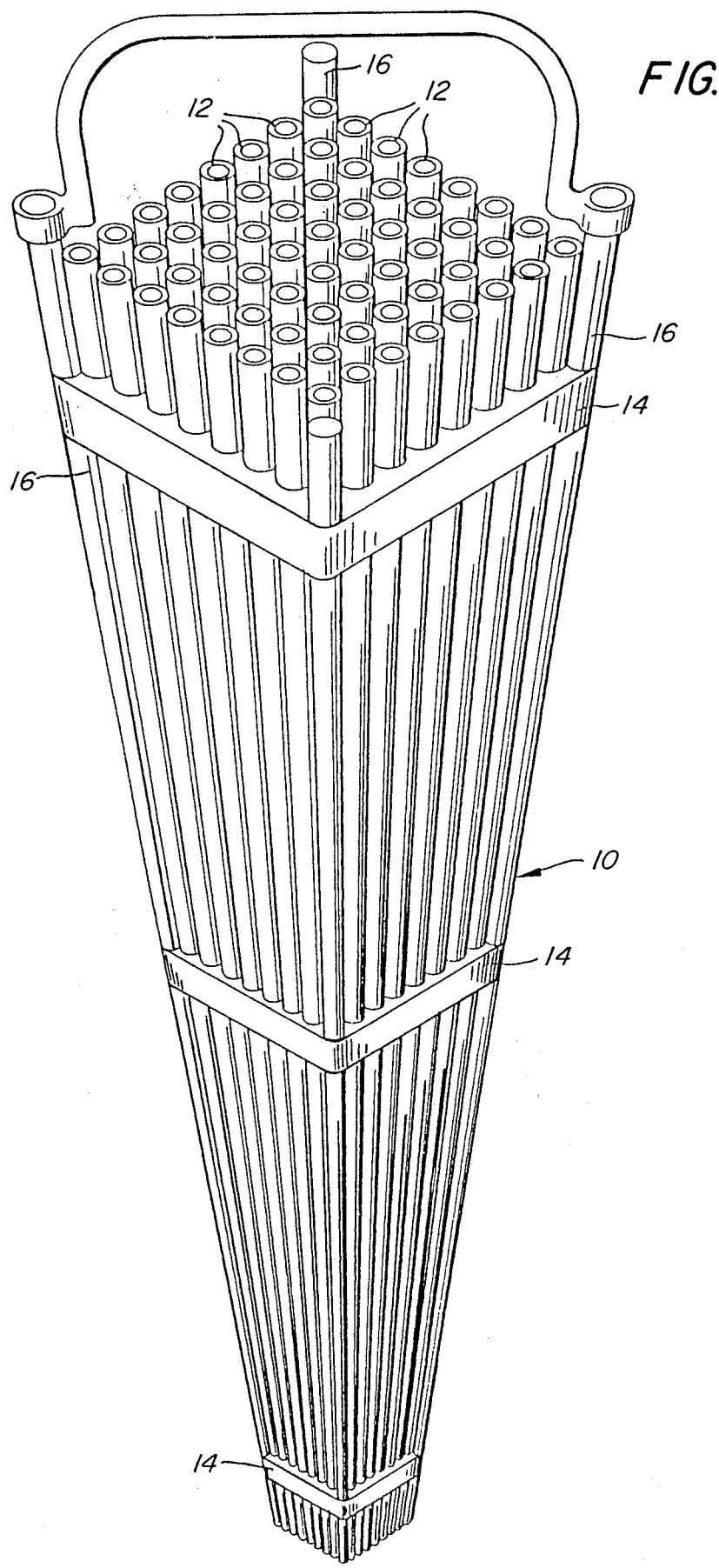
FIG. 1 is a perspective illustration of a typical fuel rod assembly.
FIG. 1A is a cross-section of a single nuclear fuel rod.

Referring now to FIG. 1, a typical fuel rod assembly 10 includes individual fuel rods 12, support grids 14, guide tubes 16 and handle 17. A cross-section of a nuclear fuel rod is illustrated in FIG. 1A, showing the nuclear fuel material 18 at the center thereof, and a metal tube 19. The individual fuel rods 12 are about 0.4–0.6 inches in diameter and about 8 feet long in one typical type of nuclear reactor installation, and about 15 feet long in another type of nuclear reactor installation. While an 8×8 array is illustrated in FIG. 1, other similar arrays are possible. For example, 14×14, 16×16, and other arrays are frequently employed, depending upon each particular reactor. One or more fuel rod assemblies are inserted into the reactor core, whereat the individual fuel rods generate heat energy as a by-product of the radioactive fission process. Once the radioactivity of the individual fuel rods 12 has been reduced below a certain level, the fuel rod assembly 10 is withdrawn from the reactor core. Thereafter, the fuel rod assembly 10 is stored in an underwater storage area.

The purpose of the present invention is to provide an apparatus which compacts the spent fuel rods from spent fuel rod assemblies which are stored in the underwater storage areas from an initial density corresponding to the density of the fuel rods assembled in an uncompacted array of the fuel rod assembly 10 in which the fuel rod density is typically 40 percent per unit volume to a final compacted array which allows the identity and location of each rod to be determinable. By increasing the density of the array of spent fuel rods, the area required to store the spent fuel rods is decreased. Typically, the spent fuel rod assembly and the individual fuel rods are maintained underwater at all times during the compaction operations.

Figure 2:
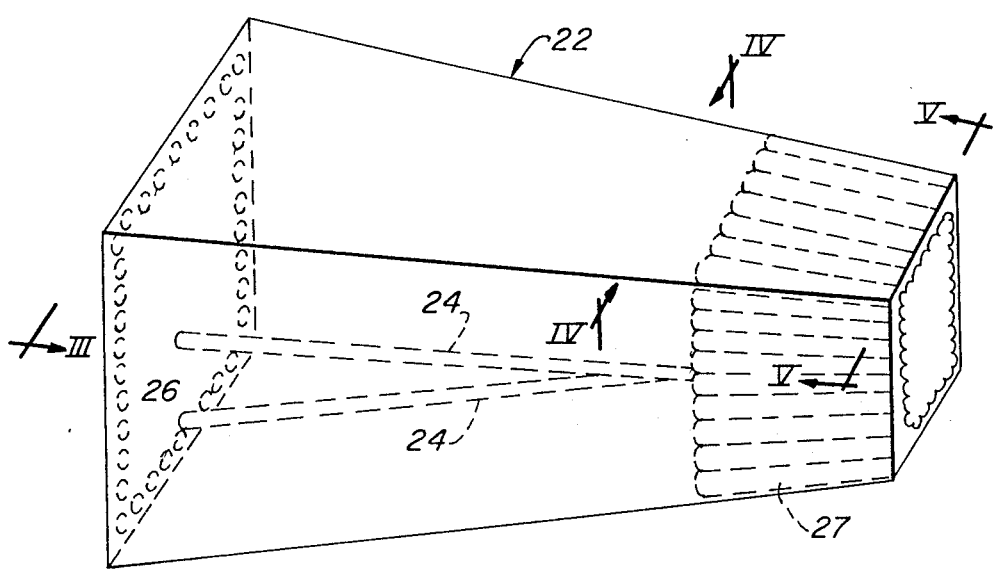
FIG. 2 is a side elevational view of the fuel rod directing chamber of the present invention.

FIG. 2 is an illustration of the fuel rod directing chamber 22 of the present invention. The chamber 22, comprised of a resilient material, is funnel-shaped and elongated in the longitudinal direction with a plurality of circular cavities 24 (two cavities 24 are illustrated) extending longitudinally therethrough. The cavities 24 are arranged in vertical columns and horizontal rows thereby forming an array of cavities 24. The individual cavities are spaced apart at a distance such that the first ends, defining openings 26, correspond in number and array with the array of fuel rods 12 in a fuel rod assembly. Cavities 24 correspond in number and array at the first end of chamber 22 with the fuel rods 12 of a fuel rod assembly, such as the fuel rod assembly of FIG. 1. Different configurations are, of course, utilized to conform to fuel rod assemblies of different dimensions.

Figure 3:
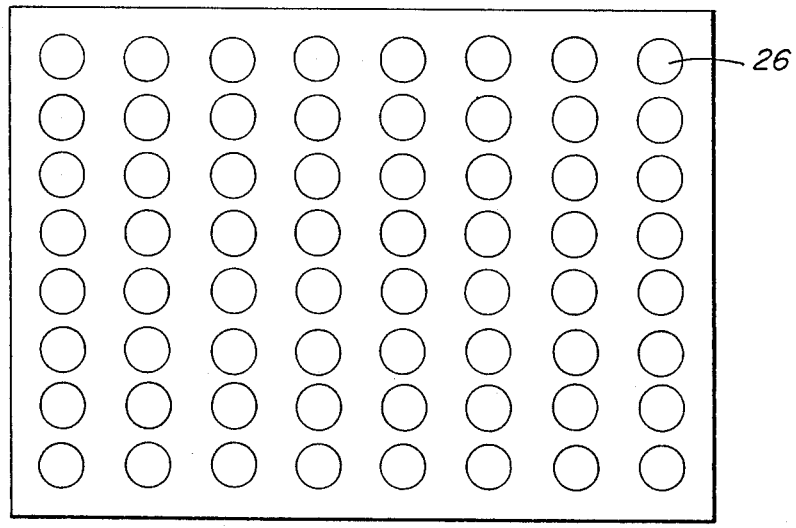
FIG. 3 is an end view taken along line V—V of the first end of the fuel rod directing chamber of FIG. 2.

FIG. 3 is an end view taken along line III—III of the fuel rod directing chamber 22 of FIG. 2. FIG. 3 illustrates the array formed by the openings 26 of the cavities 24. Preferably, the cavities 24 have diameters substantially identical to the outer diameters of the fuel rods 12. As shown by the view of FIG. 3, the end of the fuel rod directing chamber 22 appears to be a generally rectangular grid having plural circular openings 26 corresponding in number and array with an array of fuel rods 12 of a fuel rod assembly 10.

Figure 4:
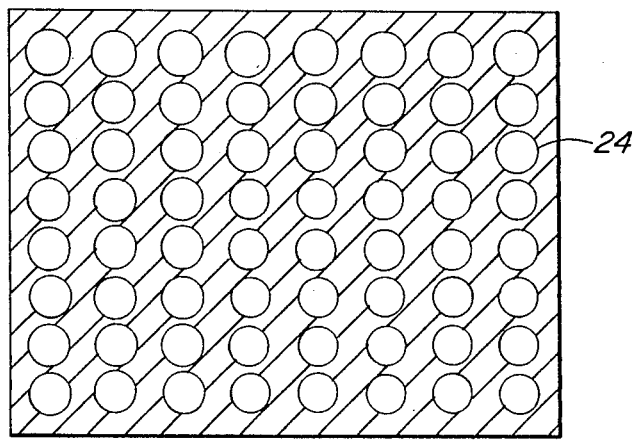
FIG. 4 is a cross-sectional view taken along line IV—IV of FIG. 2.

The spacing between the cavities 24 gradually, but continually decreases along the length of chamber 22. Illustrated in FIG. 4 is a crosssectional view taken across line IV—IV of FIG. 2 which shows the spacing between the cavities 24 at substantially the midpoint of chamber 22. As evidenced by a comparison of FIGS. 3 and 4, the spacing between the cavities 24 at the midpoint of chamber 22 is significantly less than the spacing between the cavities at the first end of the chamber.

The spacing between the individual cavities 24 continues to decrease until finally no spacing exists between the cavities 24 and the individual cavities 24 are no longer defined. The end view taken along line V—V of FIG. 2 shows the bottom end of directing chamber 22 and the bottom final consolidation section 27 formed thereat after no spacing exists between the individual cavities 24. In the preferred embodiment, the final consolidation section 27 forms a portion of chamber 22.

In use, the fuel rod directing chamber 22 is positioned at one end of a spent fuel rod assembly 10 in an underwater storage area. The ends of the fuel rod assembly 10 are removed either by shearing or by the dismantling thereof to allow removal of the individual fuel rods 12. The fuel rods 12 are drawn, either by pushing or pulling the individual rods 12, into the openings 26 of respective cavities 24 corresponding to the position in the fuel rod assembly 10 of each rod 12. As the rods 12 are guided therethrough, the rods 12 are thereby caused to deform in order to conform to the longitudinal path of the respective cavities. Because the spacing between the cavities 24 decreases along the length of the chamber 22, the spacing between the individual fuel rods 10 also decreases when the rods are passed through the chamber 22. The rate at which the spacing between the cavities 24 decreases is such that the deflection of the rods 12 never exceeds 10% of the yield strengths thereof.

Figure 5:
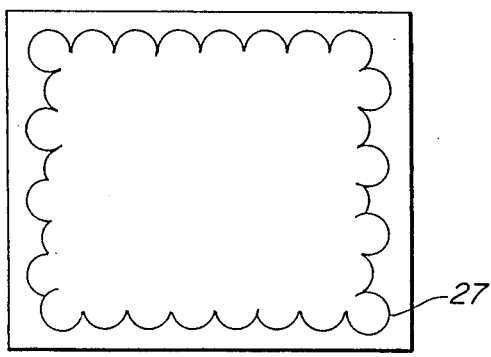
FIG. 5 is an end view taken along line V—V of the second end of the fuel rod directing chamber of FIG. 2.
Figure 6:
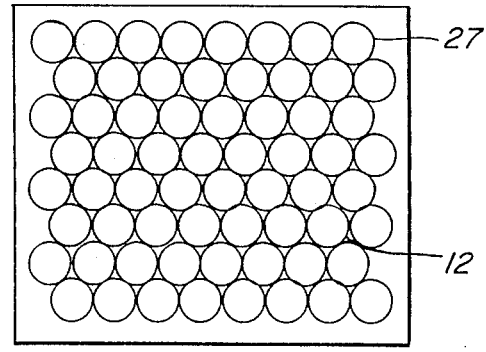
FIG. 6 is an end view of the fuel rod directing chamber similar to the view of FIG. 5 showing the configuration of fuel rods in compacted form.

FIG. 6 is a view of the chamber 22 similar to the view of FIG. 5, but illustrates the ends of a compacted array of fuel rods 12 which have passed through the directing chamber 22. No spacing exists between the individual fuel rods 12 to thereby maximize the density thereof. In such a compacted array, the reactivity of the array of fuel rods 12 may be stored safely and conveniently and the remaining fuel rod assembly skeleton may also be disassembled and stored accordingly.

Figure 7:
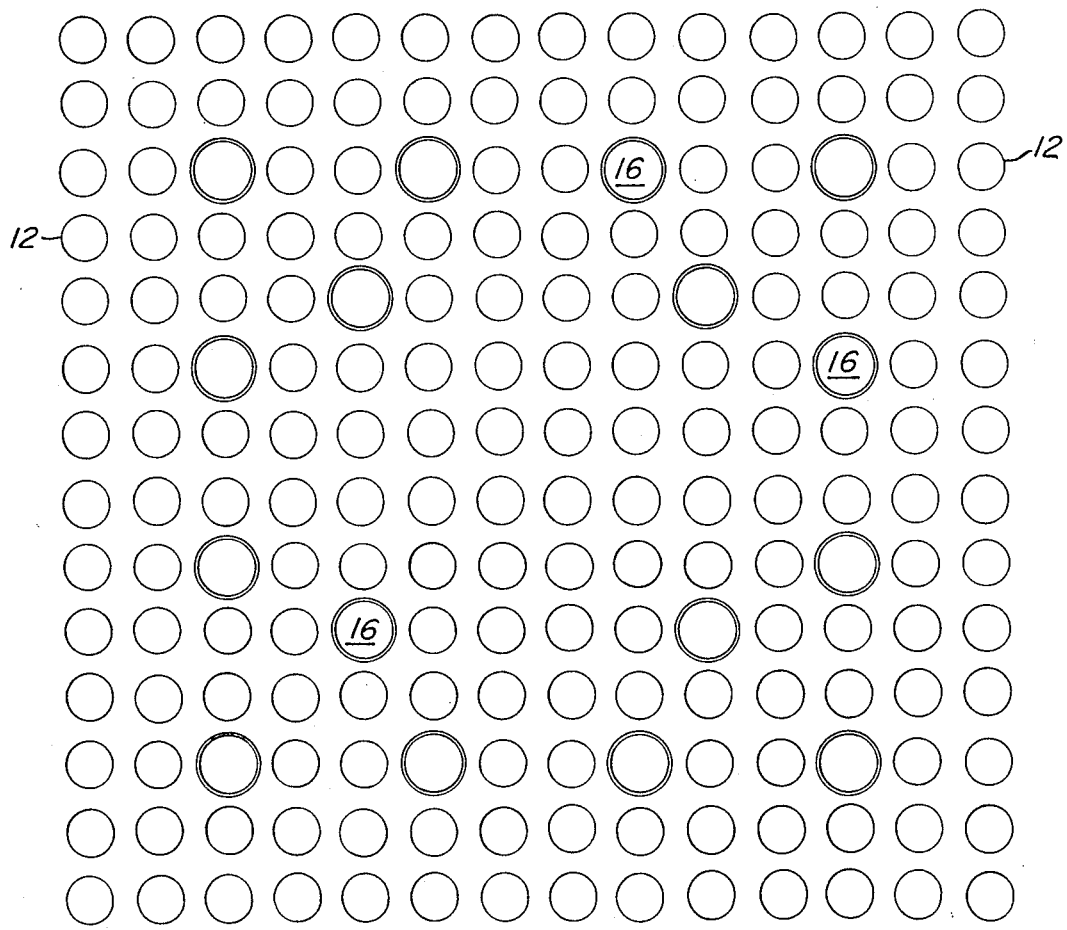
FIG. 7 is a typical cross-sectional view of an array of fuel rods and guide tubes in a 14×14 fuel rod assembly.

FIG. 7 is a cross-sectional view of a 14×14 fuel rod assembly which is similar, except in size of the array, to the 8×8 fuel rod assembly 10 illustrated in FIG. 1. The cross-sectional view includes the cross sections of fuel rods 12 and guide tubes 16. In the embodiment illustrated, 180 fuel rods and 16 guide tubes, comprise the fuel rod assembly array. In one embodiment of the present invention, only the fuel rods 12 are drawn through the fuel rod directing chamber 22. Cavities 24 of chamber 22, therefore, need only correspond to the fuel rods 12, as the guide tubes 16, and the instrument tube 18 are not drawn through the directing chamber 22. The chamber 22 may be constructed of a plurality of tubular members bounded together in which each individual tubular member defines a cavity 24, with one tubular member corresponding to each fuel rod 12 of the fuel rod assembly 10, or, alternatively, be constructed of a molded unit.

Figure 8:
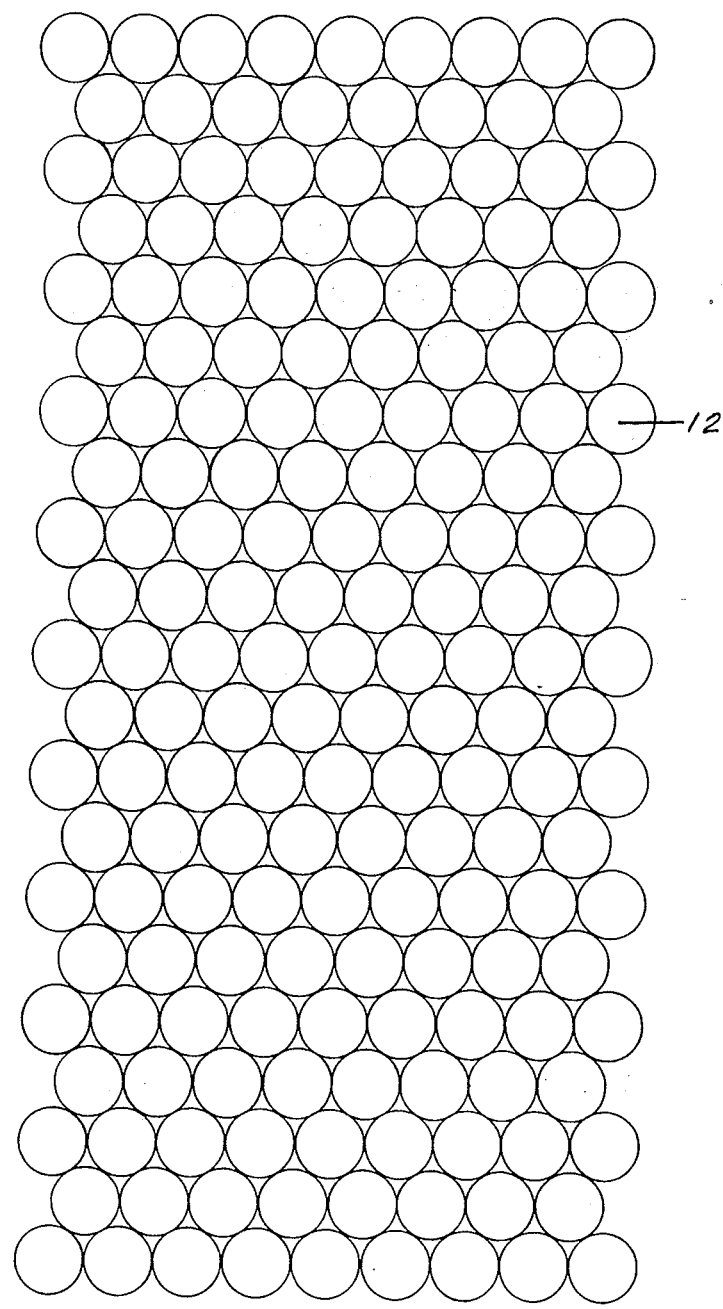
FIG. 8 illustrates a cross-sectional view of the final array of fuel rods after passing through the fuel rod directing chamber of FIG. 2.

FIG. 8 illustrates a final array of fuel rods 12 corresponding to the uncompacted fuel rod array illustrated in FIG. 7. As is evidenced by the illustration, the final array of fuel rods 12 requires approximately half the space that the array of fuel rods required in the uncompacted array of a fuel rod assembly 10. The final array is a desired array in which any three adjoining fuel rods 12 in any two rows forms an equilateral triangle—a preferred array, in which the fuel rod density per unit volume is approximately 90 percent.

Figure 9:
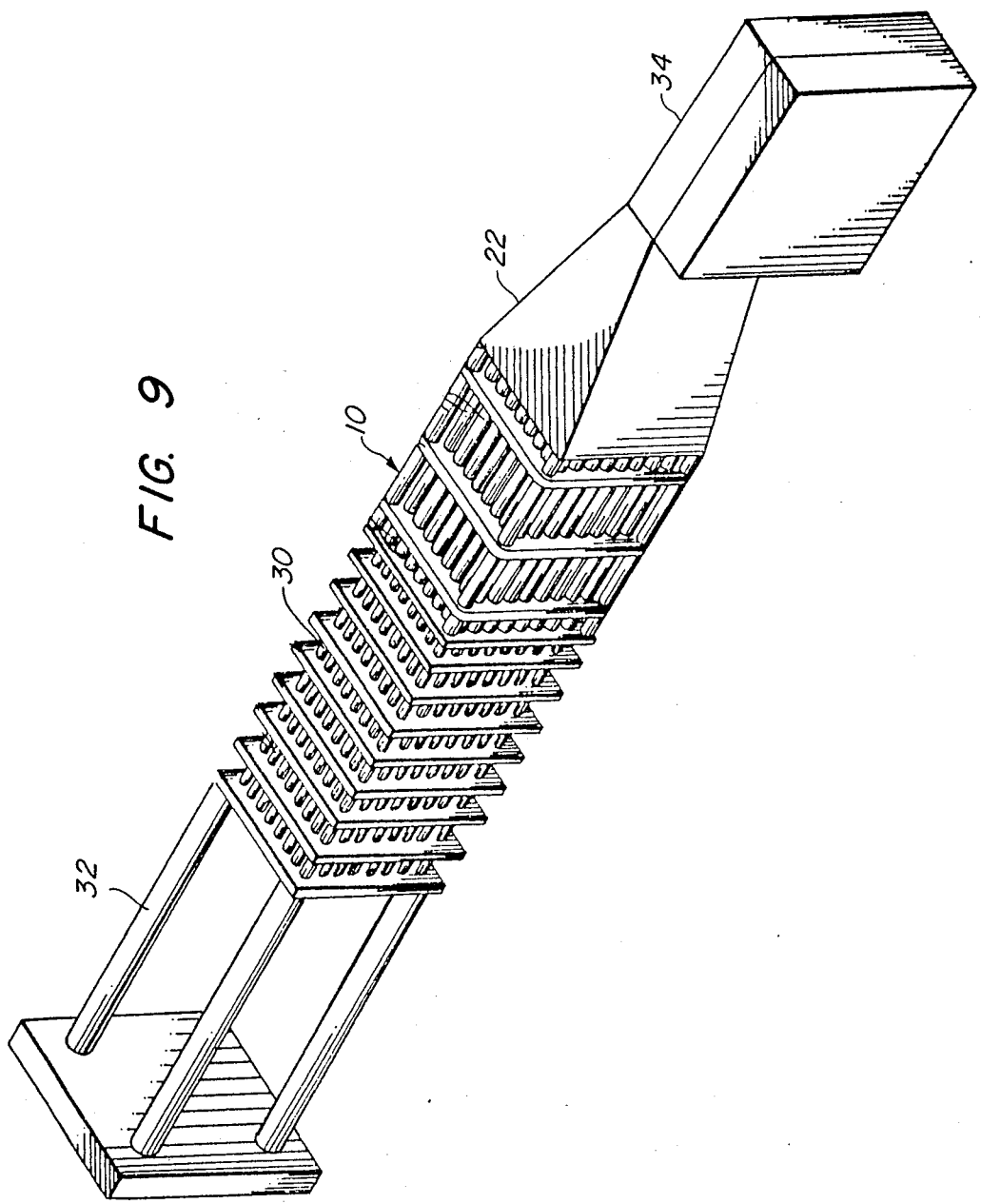
FIG. 9 is an illustration of the fuel rod directing chamber of the present invention positioned beneath a spent fuel rod assembly with apparatus installed to allow the spent fuel rods to be pushed through the chamber.

In FIG. 9 there is illustrated a fuel rod directing chamber 22 of the present invention in which the chamber 22 is positioned beneath a spent fuel rod assembly 10 to allow the individual fuel rods to be pushed out of the assembly 10. A plurality of push rods 30 caused to be translated by actuation of hydraulic cylinders 32 push against the spent fuel rods 12 causing the rods 12 to enter the openings 26 (not shown) of the entry end of chamber 22. Translation of the push rods 30 directs the spent fuel rods 12 through the individual cavities 24 of the chamber 22, thereby elastically deforming the rods 12. Once exited from the discharge end of chamber 22 in compacted form, the fuel rods 12 are stored in a storage canister 34.

Figure 10:
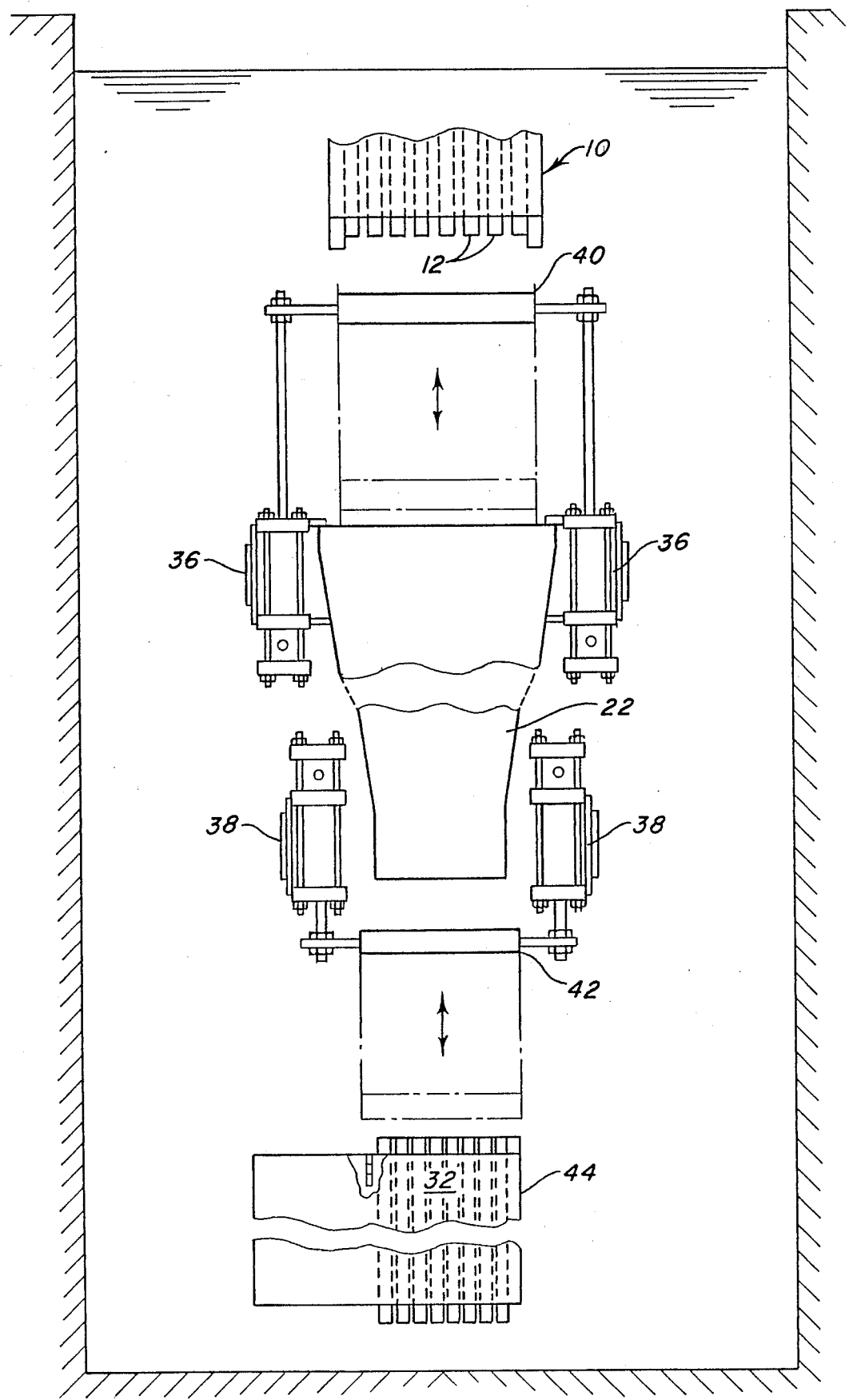
FIG. 10 is an illustration of the fuel rod directing chamber positioned beneath a spent fuel rod assembly with apparatus installed to allow the spent fuel rods to be pulled through the chamber.

FIG. 10 illustrates a fuel rod directing chamber 22 of the present invention in which the chamber 22 is positioned beneath a spent fuel rod assembly 10 to allow the individual fuel rods 12 to be pulled out of the assembly. Hydraulic cylinders 36 and 38 are positioned at the entry and discharge ends, respectively, of the chamber 22 and gripper plate assemblies 40 and 42 used to grip the fuel rods 12 are positioned across the entry and discharge ends of the chamber 22 and connected at the ends thereof to hydraulic cylinders 36 and 38, respectively. When compaction operations commence, hydraulic cylinders 36 are actuated, causing gripper assembly 40 to engage and grip the individual fuel rods 12. Hydraulic cylinders 36 are then deactuated, causing the gripper assembly 40 to pull the fuel rods 12 into the openings 26 of the entry ends of chamber 22 whereat gripper assembly 40 releases the fuel rods 12. The process of actuation and deactuation of hydraulic cylinders 36 is repeated so that the fuel rods 12 enter the cavities 26 of the chamber 22 in a step-wise manner. The fuel rods 12 are thereby directed through the individual cavities 26 of the chamber 22, thereby elastically deforming the rods 12. As the rods exit the discharge end of chamber 22, gripper assembly 42 contacts and grips the rods 12. Hydraulic cylinders 38 are actuated to thereby pull the rods 12 in compacted form from the discharge end of the chamber 22. Similar to the sequence of operation of hydraulic cylinders 36 and gripper assembly 40 to draw the rods into chamber 22, hydraulic cylinders 38 are alternately actuated and deactuated, and gripper assembly 42 alternately grips and releases the fuel rods 12, to pull the rods 12 out of the chamber 22. The fuel rods 12 are then stored in compacted form in storage container 44.

Figure 11:
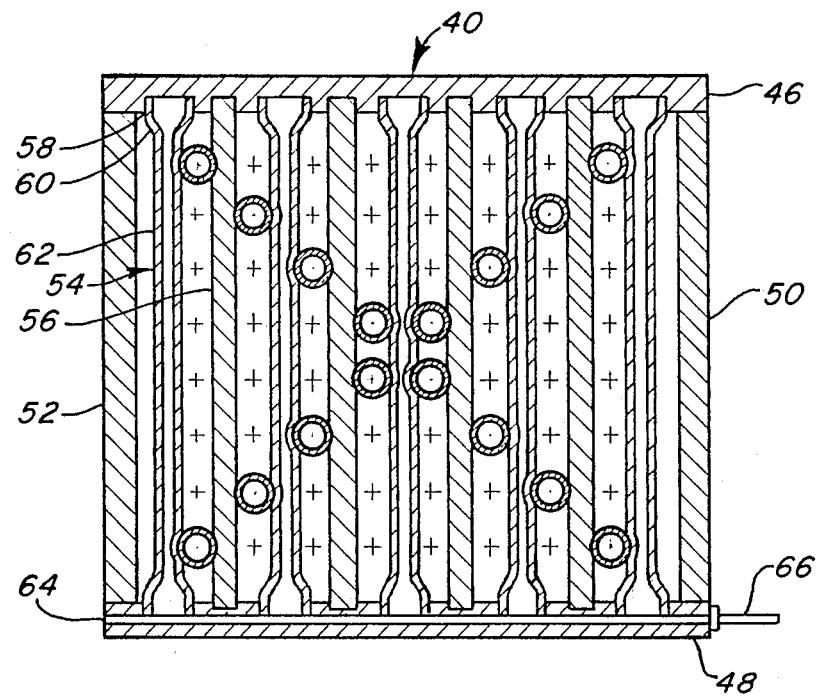
FIG. 11 is a plan view, in section of the gripper plate assembly for releasably engaging the spaced apart array of fuel rods used in the embodiment of FIG. 10.

The gripper assembly 40 is more fully shown in the overhead view of FIG. 11. The assembly has a rectangular configuration, and is comprised of side rails 46 and 48 and end rails 50 and 52. Spanning the distance between side rails 46 and 48 is an alternating arrangement of spaced-apart active and passive grippers 54 and 56, respectively. The space between the grippers is sufficient so that the fuel rods can pass in the direction of their length when the active grippers are deenergized. The active and passive grippers preferably each includes arcuate recesses 58 and 60, respectively, at spaced-apart locations along the length of each gripper corresponding to the spacing between rows of fuel rods in the array. The arcuate recesses provide an increased gripping area for engagement with the fuel rods 12. In the form of the gripper shown in FIG. 11, the passive gripper elements 56 each comprise a rectangular bar which is welded or otherwise secured to the side rails. The active grippers 54 each comprise a tube 62 preferably comprised of metal such as stainless steel. The ends of each tube 62 have a cylindrical configuration which extends to transition sections 60. Between the transition sections, the gripper has an oval configuration which can be produced by a partial flattening of a tube into the oval configuration. A passageway 64 extends along the interior of side rails 48 and communicates with an end portion of each active gripper. A conduit 66 is connected to a suitable supply of a pressurized fluid medium for delivery to the interior of each active gripper. The pressure of the fluid medium is sufficient to produce a bulging of the elliptical configuration of the tube in the direction of the minor axis of the ellipse which forces the corresponding segment of the wall of the tube against fuel rods in the gap at either side thereof formed with a passive gripper.

Figure 12:
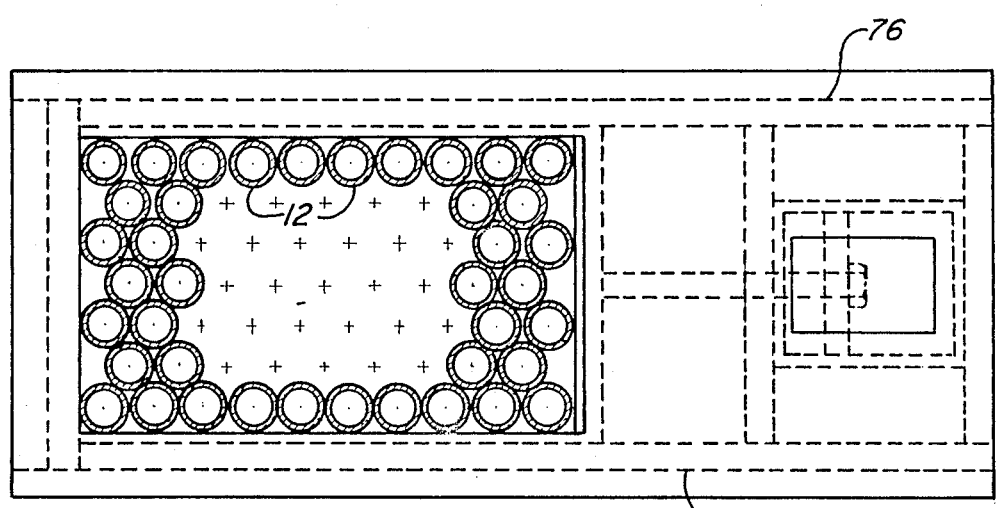
FIG. 12 is a plan view of the gripper plate assembly for releasably engaging the compacted array of fuel rods used in the embodiment of FIG. 10.
Figure 13:
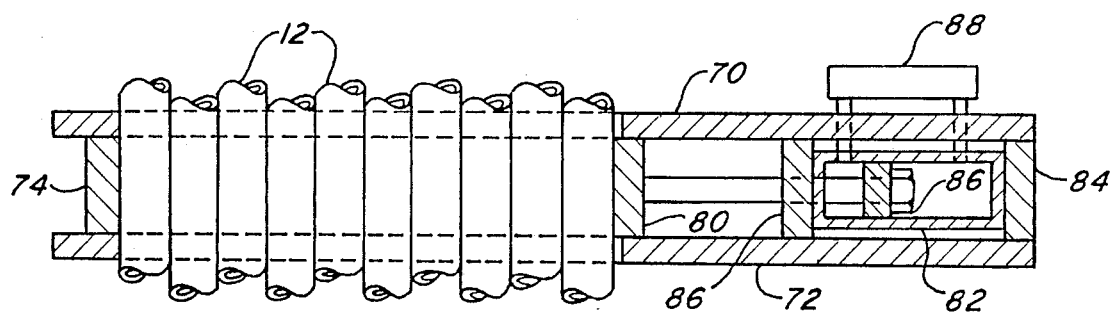
FIG. 13 is a sectional view taken along line A—A of FIG. 12.

The gripper assembly 42 used to move the bundle of fuel rods 12 may embody a construction shown in FIGS. 12 and 13 in which spaced-apart plates 70 and 72 are joined together by spacer plates 74, 76, and 78. Plates 70 and 72 each includes a rectangular opening 80 which is dimensioned to correspond to the compacted array of fuel rods emerging from the end of transition funnel 20. Plates 76 and 78 extend in a generally parallel relation and arranged therebetween is a plate 82 which can be forced into compressive engagement with the bundle of fuel rods by operation of a piston and cylinder assembly 84 that is supported in a cavity formed between anchor plates 86. As shown in FIG. 13, chambers within the piston and cylinder assembly 86 at opposite sides of the piston 86 are connected by conduits to a valve 88 to adjustably control the flow of pressurized fluid to the piston and cylinder assembly so that the gripper plate 82 can be pressed into engagement with a bundle of fuel rods to insure gripping of the fuel rod bundle.

While the present invention has been described in connection with the preferred embodiment shown in the various figures, it is understood that other similar embodiments may be used or modifications and additions may be made to the described embodiment for performing the same functions of the present invention without deviating therefrom. Therefore, the present invention should not be limited to any single embodiment, but rather construed in breadth and scope in accordance with the recitation of the appended claims.

I claim as my invention:

1. A fuel rod directing chamber for elastically deflecting a plurality of fuel rods from a first, uncompacted array corresponding to the spacing of fuel rods in a fuel rod assembly to a second, compacted array, said chamber comprising:

an elongated funnel having a consolidation section and a final consolidation section, said consolidation section having a means forming a plurality of cavities defining a plurality of openings with said openings being spaced at distances corresponding to the spacing of fuel rods in a fuel rod assembly; and wherein the distances at which the means forming the cavities are spaced apart decreases along the length of said funnel, and terminate at an entry end of the final consolidation section, said final consolidation section comprising only a wall extending about the outer perimeter of fuel rods discharged from said consolidation section, said final consolidation section having a discharge end corresponding to a perimeter of the compacted array.

2. The fuel rod directing chamber of claim 1 further including means for supporting said fuel rod assembly containing the plurality of fuel rods proximate to the entry end of the consolidation section of the elongated funnel, and means for drawing the plurality of fuel rods through said means forming the plurality of cavities such that said fuel rods are merged towards one another to cause the density of said fuel rods to be everincreasing and whereby the reactivity of the array of fuel rods is continuously reduced.

3. The fuel rod directing chamber of claim 2 wherein the wall extending about the outer perimeter defines an area corresponding to an area to cause the density of said fuel rods after being drawn through said chamber to be at least twice that of the fuel rod density of the fuel rod assembly.

4. The fuel rod directing chamber of claim 1 wherein said elongated funnel is comprised of a resilient material.

5. The fuel rod directing chamber of claim 1 wherein said cavities are circular to correspond to the outer diameters of said fuel rods.

6. The fuel rod directing chamber of claim 1 wherein said elongated funnel is comprised of a plurality of tubular members.

7. The fuel rod directing chamber of claim 1 wherein said elongated funnel is a molded unit.

8. The fuel rod directing chamber of claim 1 wherein said funnel extends for a distance after no spacing exists between the plurality of cavities to thereby form a final consolidation section.

9. A method for elastically deflecting a plurality of fuel rods from a first, uncompacted array corresponding to the spacing of fuel rods in a fuel rod assembly to a second, compacted array, including the steps of:

removing the ends of the fuel rod assembly;

positioning an entry end of a fuel rod directing chamber at one end of the fuel rod assembly, said fuel rod directing chamber having a final consolidation section remote from said entry end, said final consolidation section comprising only a wall formed by an outer periphery of the fuel rod directing chamber;

drawing said fuel rods through a means forming a plurality of cavities extending through said fuel rod directing chamber to thereby deflect the fuel rods into said compacted array at said final consolidation section; and storing said compacted array of fuel rods in a fuel rod storage canister.

10. The method of claim 9 wherein the step of removing the ends of the fuel rod assembly includes shearing the ends of the fuel rod assembly.

11. The method of claim 9 wherein the fuel rod directing chamber is positioned beneath the fuel rod assembly.

12. The method of claim 9 wherein said step of drawing includes pulling the fuel rods through the means forming a plurality of cavities of the fuel rod direction chamber and into the final consolidation section of the fuel rod directing chamber.

13. The method of claim 9 wherein said step of drawing includes pushing the fuel rods through the means forming a plurality of cavities of the fuel rod directing chamber and into the final consolidation section of the fuel rod directing chamber.

14. The method of claim 9 wherein said directing chamber includes an elongated funnel having a means forming a plurality of cavities extending longitudinally therethrough; said funnel comprised of a consolidation section and a final consolidation section having an entry end wherein the means forming the plurality of cavities defines a plurality of openings with said openings being spaced at distances corresponding to the spacing of fuel rods in a fuel rod assembly; and wherein the distances at which the means forming the cavities are spaced apart decreases along the length of said funnel and terminate at an entry end of the final consolidation section, said final consolidation section comprising only a wall extending about the outer perimeter of fuel rods discharged from said consolidation sections, said final consolidation section having a discharge end corresponding to a perimeter of the compacted array.

15. The method of claim 14 wherein the decrease of the distances at which the cavities are spaced apart causes stresses on the individual fuel rods of a magnitude less than the magnitude of the yield strength of cladding of the fuel rods when the fuel rods are drawn therethrough.

* * * * *